(12) United States Patent
Waldburger

(10) Patent No.: US 8,916,221 B2
(45) Date of Patent: Dec. 23, 2014

(54) METHOD FOR PRODUCING CHEESE

(71) Applicant: Kalt Maschinenbau AG, Lütisburg (CH)

(72) Inventor: Peter Waldburger, Niederbüren (CH)

(73) Assignee: Kalt Maschinenbau AG, Lütisburg (CH)

( * ) Notice: Subject to any disclaimer, the term of this patent is extended or adjusted under 35 U.S.C. 154(b) by 0 days.

(21) Appl. No.: 14/031,599

(22) Filed: Sep. 19, 2013

(65) Prior Publication Data

US 2014/0087045 A1    Mar. 27, 2014

(30) Foreign Application Priority Data

Sep. 21, 2012  (CH) ........................................ 1711/12

(51) Int. Cl.
*A01J 25/13* (2006.01)
*A01J 25/12* (2006.01)

(52) U.S. Cl.
CPC ............... *A01J 25/123* (2013.01); *A01J 25/13* (2013.01)
USPC ............ 426/478; 426/518; 426/512; 426/582

(58) Field of Classification Search
CPC ....... A01J 25/00; A01J 25/001; A01J 25/123; A01J 25/13; A01J 25/14; A23P 1/105; A23P 2001/10; A23C 2250/20
USPC .................................. 426/478, 518, 512, 582
See application file for complete search history.

(56) References Cited

U.S. PATENT DOCUMENTS

| | | | | | |
|---|---|---|---|---|---|
| 2,846,767 | A | * | 8/1958 | Hensgen et al. | 99/458 |
| 3,192,626 | A | * | 7/1965 | Le Boeuf | 99/456 |
| 3,353,269 | A | * | 11/1967 | Lambert et al. | 83/19 |
| 3,514,857 | A | * | 6/1970 | Rossen | 425/84 |
| 3,615,587 | A | * | 10/1971 | Koopmans | 426/582 |
| 3,748,072 | A | * | 7/1973 | Whelan | 425/85 |
| 3,802,332 | A | * | 4/1974 | Fassbender et al. | 99/452 |

(Continued)

FOREIGN PATENT DOCUMENTS

| | | |
|---|---|---|
| CH | 704208 | 6/2012 |
| DE | 922448 | 1/1955 |

(Continued)

OTHER PUBLICATIONS

University of Montana, Agricultural Experiment Station Circular #1. 1910. pp. 1-8.*

(Continued)

*Primary Examiner* — Anthony Weier
(74) *Attorney, Agent, or Firm* — Paul D. Bianco; Martin Fleit; Fleit Gibbons Gutman Bongini & Bianco PL

(57) ABSTRACT

A method for producing cheese and a device therefore, in particular what is known as a cassette press with round or angular cheese molds. The method is intended in particular to achieve gentle and hygienic de-molding of the cheese blocks after removal of whey. A raw cheese mass is first poured into molds of a cassette press, then pressed to remove liquid and emptied out of the mold after a turning process. Directly after turning, the raw cheese mass in the mold is subjected to a shaking movement, so the pressed raw cheese mass is detached gently from the inner wall of the mold.

5 Claims, 6 Drawing Sheets

(56) References Cited

U.S. PATENT DOCUMENTS

| | | | |
|---|---|---|---|
| 3,838,955 A * | 10/1974 | Dubbeld | 425/84 |
| 3,973,042 A * | 8/1976 | Kosikowski et al. | 426/35 |
| 4,049,838 A * | 9/1977 | Krueger et al. | 426/478 |
| 4,268,528 A * | 5/1981 | Montigny | 426/40 |
| 4,515,815 A * | 5/1985 | Kosikowski | 426/40 |
| 4,750,415 A * | 6/1988 | Ostemar | 99/458 |
| 5,206,496 A | 4/1993 | Clement et al. | |
| 6,465,033 B2 * | 10/2002 | Menninga et al. | 426/512 |
| 7,757,876 B1 | 7/2010 | Ditter | |
| 2007/0196537 A1 | 8/2007 | Winkler | |
| 2010/0263551 A1 * | 10/2010 | Pavero | 99/348 |

FOREIGN PATENT DOCUMENTS

| | | |
|---|---|---|
| DE | 1582967 | 7/1970 |
| DE | 2950497 | 6/1981 |
| DE | 3529895 | 2/1987 |
| EP | 0350777 | 1/1990 |
| EP | 0406899 | 1/1991 |
| EP | 0543185 | 5/1993 |
| EP | 0543899 | 6/1993 |
| EP | 1269832 | 1/2003 |
| EP | 1769676 | 4/2007 |
| FR | 2462253 A1 | 2/1981 |
| FR | 2473840 A1 | 7/1981 |
| FR | 2919467 * | 2/2009 |
| GB | 951746 A | 3/1964 |
| GB | 2065487 | 7/1981 |

OTHER PUBLICATIONS

Mechanical English Translation for FR 2462253 published Feb. 1981.*

Mechanical English Translation for FR 2473840 published Jul. 1981.*

Mechanical English Translation for FR 2919467 published Feb. 2009.*

Derwent Abstract for SU 876084 published Oct. 1981.*

European Search Report issued for Application No. 13183880.7 dated Feb. 4, 2014.

* cited by examiner

METHOD FOR PRODUCING CHEESE

CROSS REFERENCE TO RELATED APPLICATION

This application claims priority under 35 U.S.C. §119 to Swiss Patent Application No. CH-01711/12 filed 21 Sep. 2012, the entire contents of which are incorporated herein by reference.

FIELD OF THE INVENTION

The invention relates to a method for producing cheese and a device therefore, in particular what is known as a cassette press with round or angular cheese moulds.

BACKGROUND OF THE INVENTION

A device for the industrial production of cheese blocks is known e.g. from EP-A-350777. This comprises a wash-in press having a rectangular trough, which is open at the top, for receiving moulds, a frame for arranging a press head, which can be lowered and raised, and a distribution head for feeding and metering the raw cheese mass into the moulds, and a gantry carriage for guiding the distribution head and handling a turning mechanism for the moulds. The distribution head and the turning mechanism must be provided and changed manually. EP-A-406899 discloses a development of such a device, in which the moulds are accommodated in cassettes, which are in turn arranged in a compact manner in rows in the trough. Provided above the moulds is a press head with press dies directed at the moulds for pressing the raw cheese mass. The cassettes have an edge formation that minimises gaps, and a mechanised apparatus is provided for pushing the cassettes.

The trough can also be assigned a table for second moulds, into which the pressed raw cheese blocks are transferred (EP-A-1769676). The second moulds can be supplied to a further work section by means of a roller conveyor apparatus of a corresponding handling apparatus of the press.

According to EP-B-543185, a mould cover can be connected to the press die by means of a tilting apparatus (in a self-centring manner), so that the cheese mass is prevented from being sucked onto the mould cover as a result of possible tilting movements. The mould itself is round or rectangular and can consist of an outer container and an inner, perforated liner.

The pressed cheese blocks can be removed from the mould for example by means of a gripper, air being blown into the press mould beforehand to detach the cheese block from the mould wall (EP-B-1269832 or DE-B-922448).

Contact between the cheese blocks and air or other gases blown in can however present a hygiene problem. To avoid this, attempts have also been made to remove cheese blocks from the press mould by means of vacuum grippers. However, this leads to cone formation or generally to surface damage or even to breakage of the block.

It is also known to remove the whey from soured milk or cheese mass in a U-shaped strip of fabric (DE-A-2950497) or in a screw press (DE-A-3529895). While the cheese mass is being pressed and shaped, the pressing pressure can also pulse to improve removal or liquid.

According to DE-A-1582967 the soured milk is pressed from below upwards in an obliquely arranged and perforated pipe, which is subjected to the effect of vibrations. The amplitude of the vibrations is regulated in such a manner that sufficient drying of the soured milk is achieved. At the opening of the pipe at the top, the exiting mass is cut into portions and conducted away.

SUMMARY OF THE INVENTION

One aspect of the invention is based on developing a method for producing cheese, with which in particular gentle and hygienic de-moulding of the cheese blocks can be achieved.

According to an embodiment of the invention, the cheese block or raw cheese mass is detached from the inner wall of the press mould by shaking the pressed cheese block directly before de-moulding. The shaking movement is initiated directly after a turning process of the mould, so that the cheese blocks can fall straight onto a table or the like.

In an embodiment, the shaking only takes place for a short time. The larger the cheese block, the lower the shaking frequency to be selected.

The shaking movement can take place horizontally or vertically.

The cheese blocks are not only de-moulded in a gentle manner, but also no longer come into contact with previous handling elements, which allows more hygienic de-moulding and forwarding of the cheese blocks.

The shaking movement according to the invention preferably takes place in a different manner at low frequency, acts for only a short time, i.e. a few seconds, and at least one shake is carried out with few strokes.

A further aspect consists in improving a generic device for cheese production, a cassette press, and achieving a gentle and hygienic de-moulding of the cheese blocks. The cassette press is provided with a horizontally arranged shaker unit, which can be assigned a conveyor apparatus, which is situated essentially horizontally and parallel to the shaker unit.

The shaker is preferably arranged outside the moulds and the cassette; two unbalance motors are particularly preferably used for this. The unbalance motors are arranged on a clamping frame, which is mounted such that it can oscillate, for example on spring elements or rocker posts.

BRIEF DESCRIPTION OF THE DRAWINGS

The invention is described in more detail below in an exemplary embodiment using a drawing. In the drawing.

DETAILED DESCRIPTION

Figure 1:
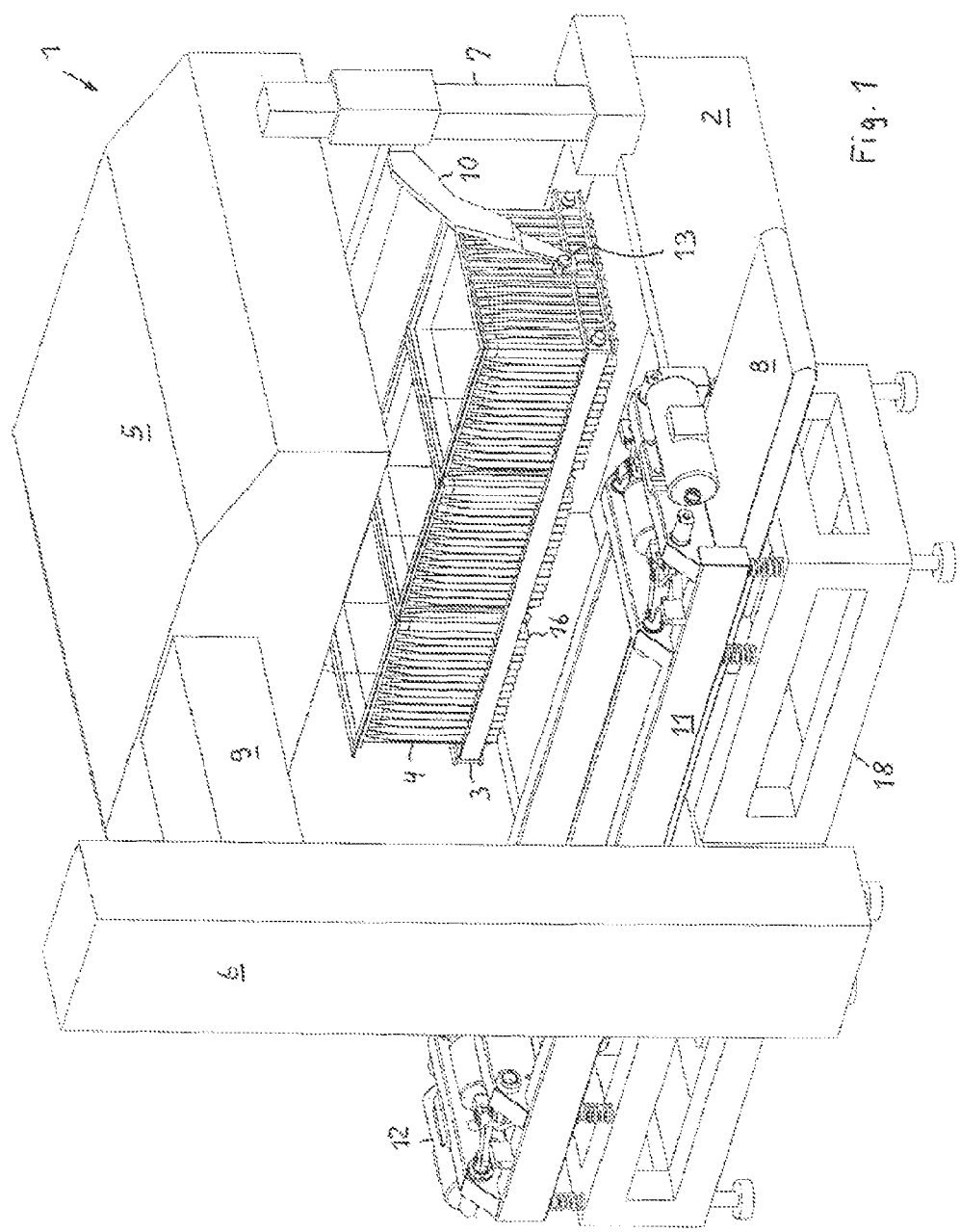
FIG. 1: shows a cassette press in partial view, with a clamping frame.

The device for cheese production, in this case for the liquid-reducing pressing of raw cheese mass, comprises, including the disclosure of CH-A-704208 a trough 2, which is rectangular when viewed from above and open at the top (shown in section, FIG. 1), of a cassette press 1 having cassettes 3, which are rectangular when viewed from above and open at the top, and are arranged next to each other in rows transversely to the longitudinal direction of the trough 2, moulds 4 for receiving the raw cheese mass to be pressed, which are arranged in the cassettes 3, wherein a mould 4 is part of the cassette 3 and has at least one base and one liner with at least one outlet for the liquid to be pressed out, and wherein a cassette comprises at least one mould, and at least the base of the mould 4 can be provided with a rib structure 16, on the upper edges, which form the outer sides of the cassette block in the trough 2 in the longitudinal and transverse directions, edge plates of a few centimeters in height can be arranged, to allow the raw cheese mass to pour in (e.g. by means of a pipe distributor or other means) to above the cassette top edge a press head 5 mounted on end columns 6 and having a multiplicity of press dies, which are directed at the moulds 4 and not shown explicitly, for pressing the raw cheese mass, e.g. configured according to the disclosure of EP-B-543899, as well as holders where necessary for pressing the press head 5 off the cassettes 3 a pipe distribution system or a filling machine for pouring in the raw cheese mass, at least one handling apparatus 7, which can be moved in a motorised manner along the longitudinal sides of the trough 2, for lifting, moving and placing a cassette 3 on a conveyor apparatus 8 outside the trough 2, wherein the conveyor apparatus 8 is arranged inside the corresponding end column 6, for which reason the said end column 6 is spaced apart from the press head 5 and the trough 2 by means of cross members 9 an apparatus for rotating/turning (turning unit 10) the cassette 3 or the row of cassettes about their longitudinal axis a shaker, which is arranged horizontally above the conveyor apparatus 8 and spring-mounted on a substructure 18, in the form of a square-shaped clamping frame 11, 20 for receiving the cassette 3, which is provided with two unbalance motors 12, 21, i.e. with one unbalance motor on each narrow side and after shaking the cheese blocks are emptied onto the conveyor apparatus 8, which is arranged movably between the clamping frame 11, 20 and the substructure 18.

A cassette 3 consists at least of a frame, which consists of struts on which are provided drive centring pins 13 for receiving and turning the cassette 3 and centring pins for the trough and clamping frame.

The rib structure 16 of the outer wall of the metallic mould 4 and in particular of the mould base not only allows a double base to be dispensed with but also allows a visual check of the same and likewise the use of stable moulds consisting of plastic.

The handling apparatus 7 comprises according to CH-A-704208 two columns which are connected to each other, on which a cross member is guided, on which in turn receiving arms for the cassettes 3 are arranged. The receiving arms are also provided with cassette stopping blocks.

A drive shaft above the cross member acts to carry out the stroke, and drive gears on a toothed rack provide the lift and the horizontal movement. The stroke is limited towards the top and bottom by dampers on the columns.

The turning unit 10 has a receiving shaft, which can be rotated in a motorised manner, with a plastic receiving pin and a turning support.

Figure 2:
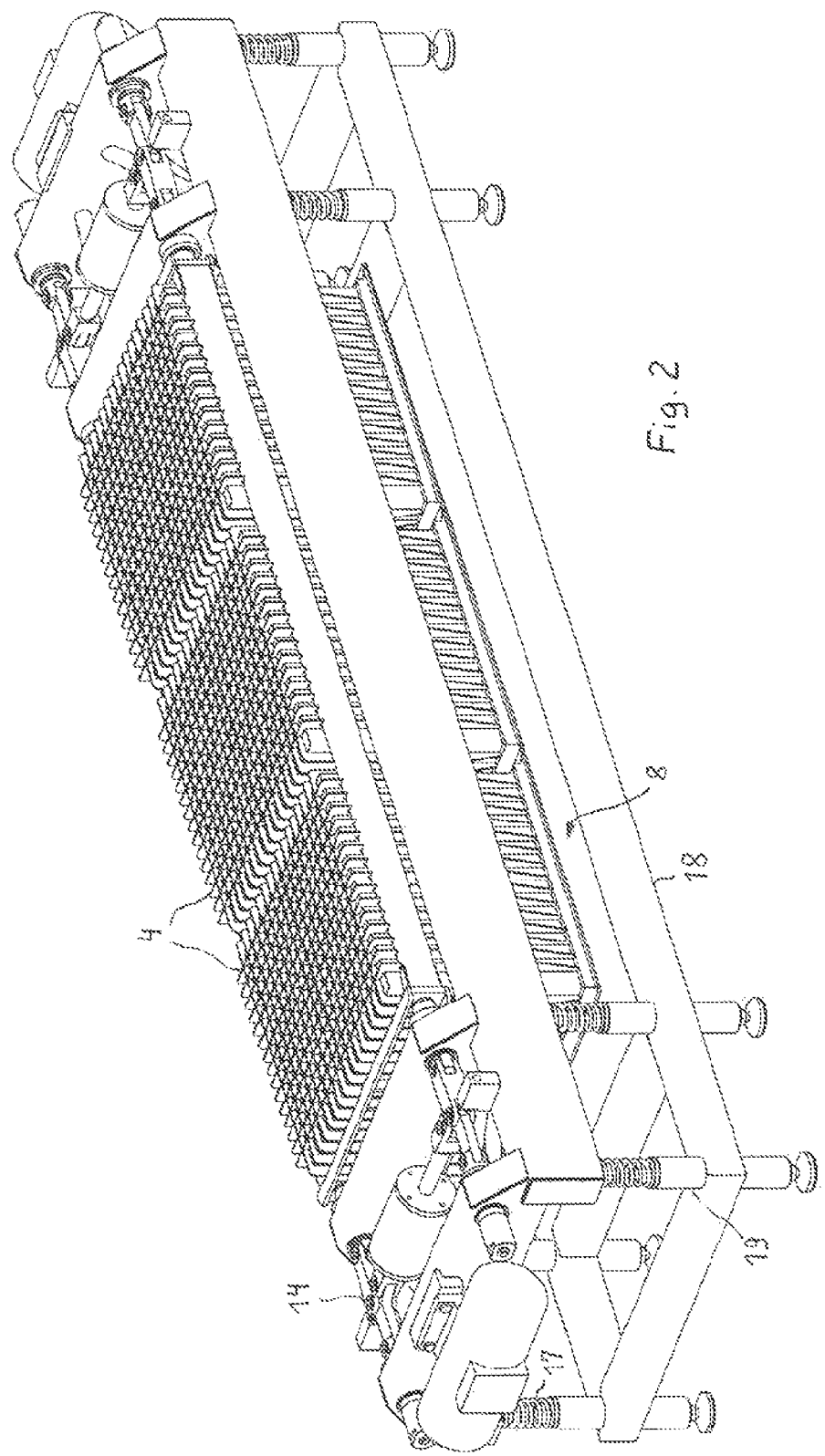
FIG. 2: shows a cassette press according to FIG. 1 after moulds have been placed in the clamping frame.

To carry out the turning process, the cassettes 3 are first held by drive rotating pins 13, which are fastened to the cassette 3, in recesses in the receiving arms of the handling apparatus 7, lifted and secured by means of the cassette stopping blocks. The cassette closest to the turning unit 10 is used to start. Then the cassettes 3 are moved over the clamping frame 11, turned and placed in the latter (FIG. 2). The receiving arms can move back, and the cassette 3 is fixed between chucks 15 by actuating toggle joints 14. Then the unbalance motors 12 synchronously execute a vertical shaking movement of a few strokes and the cheese blocks detach from the inner wall of the mould 4 in a gentle manner without the block surface being damaged.

Figure 3:
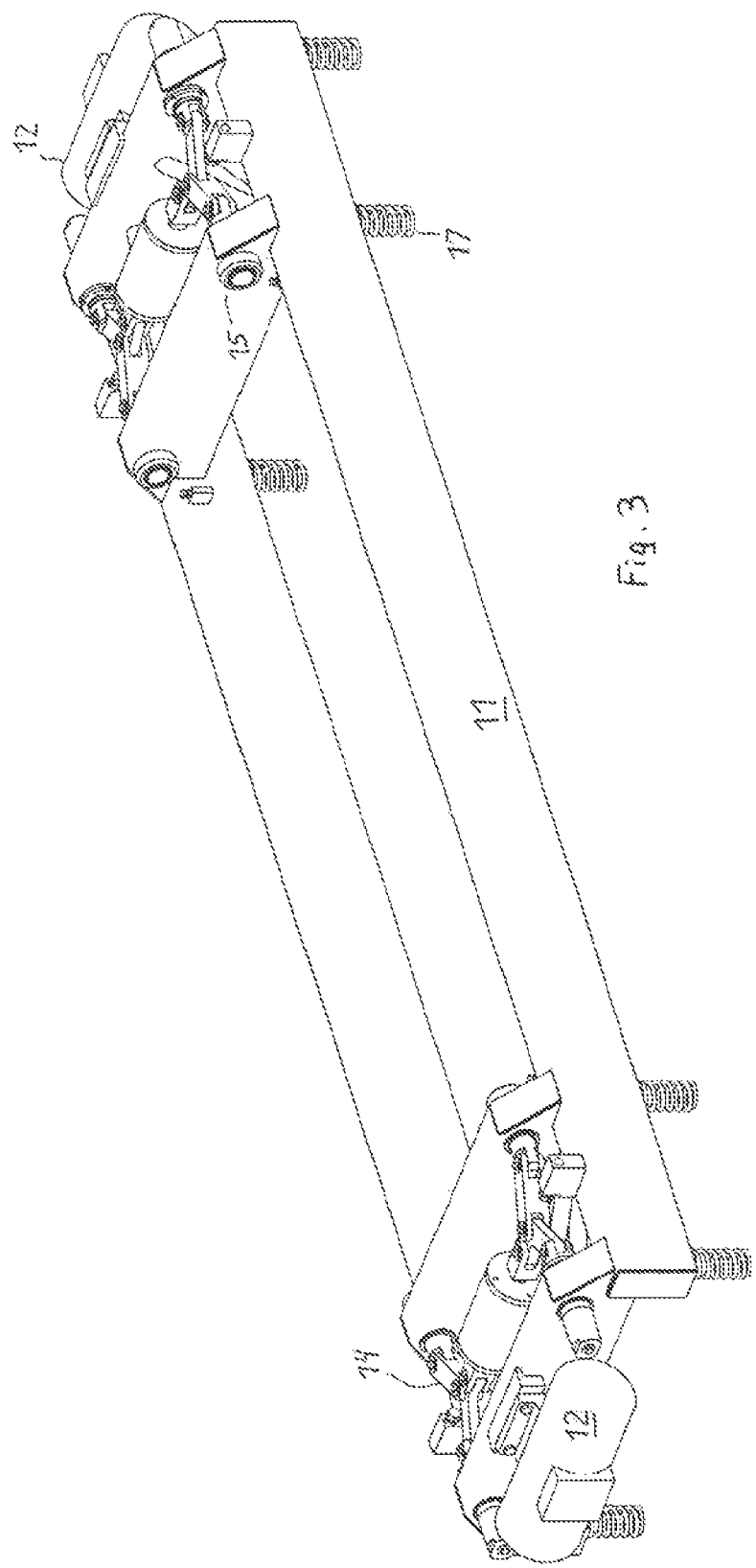
FIG. 3: shows the clamping frame according to FIG. 1 in a detail view.

The cassette 3 is only fastened in the clamping frame 11 and is not otherwise supported during shaking. In a first embodiment (FIGS. 1 to 3), the clamping frame 11 only rests on the substructure 18 by means of eight solid spring elements 17 (compression springs), the spring elements 17 being held and centred by means of centring pins 19 (FIG. 2). The clamping frame 11 can therefore freely oscillate together with the cassette 3 during shaking.

Because the clamping frame 11 is mounted on spring elements 17, the shaking movement is not transmitted to the conveyor apparatus 8 or the structure of the cassette press 1 itself.

After the cheese blocks have been set down, the handling apparatus 7 moves back up synchronously with the cassette 3, the cassette 3 is rotated into the starting position in the receiving pin, received by the handling apparatus 7 again, moved, and set down at the above-mentioned location in the trough 2.

The cassette 3 is positioned with the open cover face on or above the conveyor apparatus 8 and the moulds 4 are emptied; the cheese blocks fall onto the conveyor apparatus 8.

Figure 4:
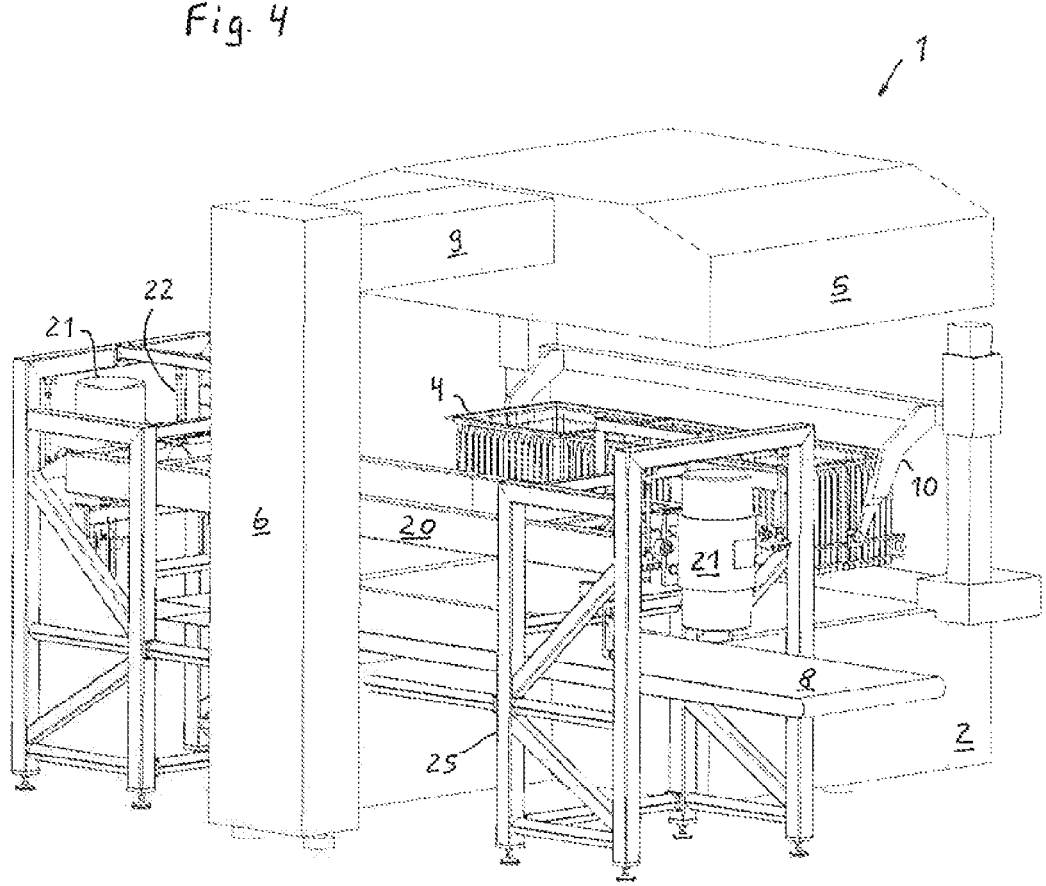
FIG. 4: shows the cassette press according to the invention in a further embodiment.
Figure 5:
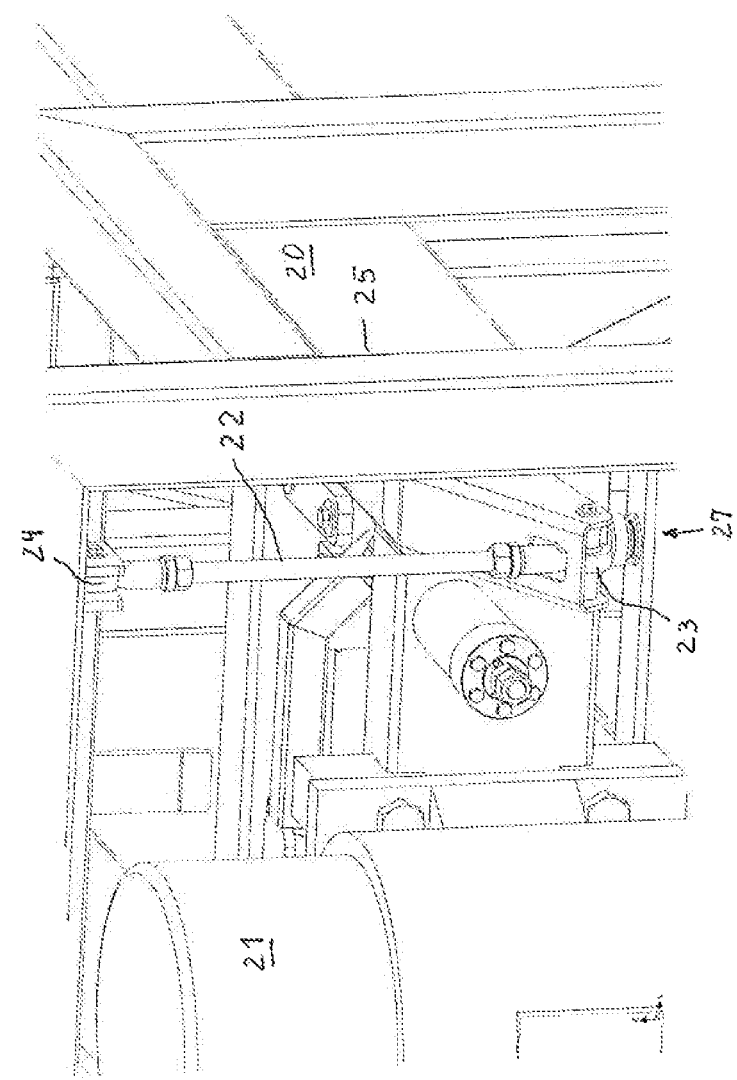
FIG. 5: shows a partial view of the clamping frame of the further embodiment according to FIG. 4.
Figure 6:
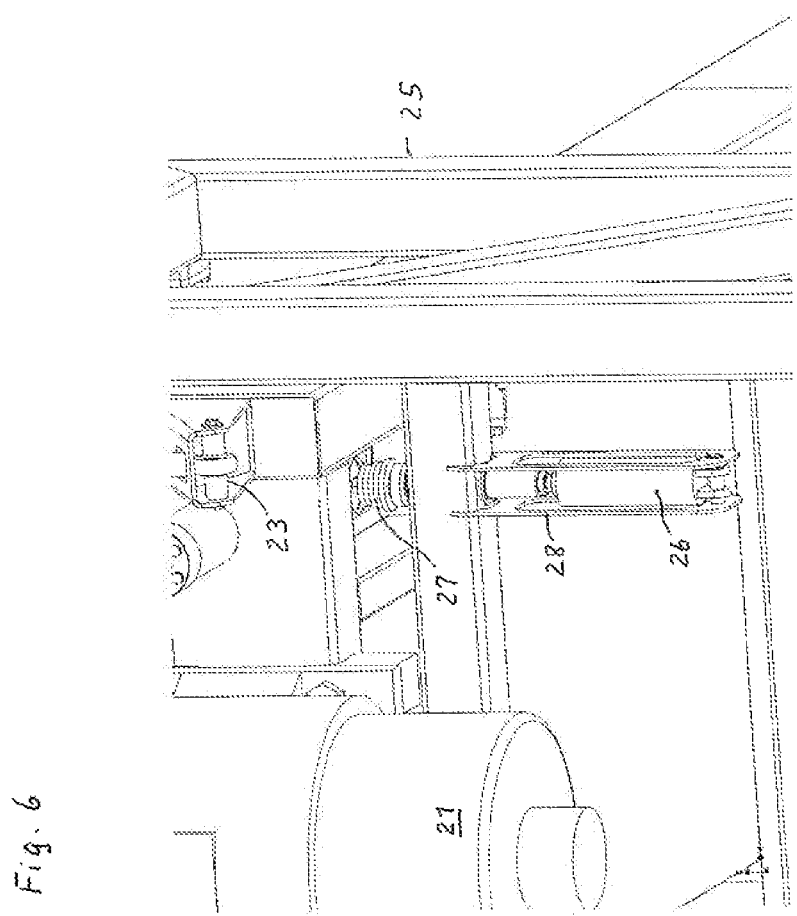
FIG. 6: shows a partial view of the clamping frame according to FIG. 5.

In a further embodiment according to FIGS. 4 to 6, the clamping frame 20 is not supported on spring elements, but is suspended in a freely oscillating manner on four rockers posts 22. To this end, a support structure 25 is provided, on the narrow sides of which upper bearings 24 are attached to receive a rocker post 22. Provided at each corner of the clamping frame 20, which is comparable in its basic structure to the clamping frame 11, is a lower bearing 23 for receiving a rocker post 22. The bearings 23, 24 allow relative mobility of the rocker posts 22 transversely to the longitudinal axis of the rocker posts 22. The clamping frame 20 can thus execute a flat circular oscillation movement as soon as the unbalance motors 21, analogously to the unbalance motors 12, are in operation.

The rocker posts 22 do not have an interfering resonant frequency and are not loaded to bending. An approximately circular, horizontal shaking movement is thus possible. Compared to the first embodiment with spring elements 17, the shaking movement runs from the start, i.e. largely without delay and with a low resonant frequency (approx. 1 Hz) compared to springs.

To allow a short cycle of approx. 5 s, rapid damping of the oscillation movement is necessary after the cheese blocks have been detached from the mould inner wall. Analogously to the first embodiment, the main damping takes place by means of a counter-excitation of the unbalance motors 12, 21. Four additional dampers are provided for rapid braking. These are arranged on the underside of the clamping frame 20 and coupled to the support structure 25. They comprise a rubber damper 27, which is accommodated in the clamping frame 20. The rubber damper 27 in turn is arranged on the piston rod of a damping cylinder 26, and the damping cylinder 26 is suspended under the clamping frame 20 in a suspension 28 in the support structure 25 in such a manner that relative mobility of the piston rod transversely to its longitudinal axis is provided.

The cheese blocks are therefore de-moulded by means of shaking and gravity. The shaking frequency is preferably low and is for example approx. 13 Hz for larger cheese blocks, generally up to 40 Hz.

The excitation frequency of the unbalance motors 12, 21 is set approximately in accordance with the resonant frequency of the cheese, which depends on consistency. The lower the resonant frequency of the cheese, the higher the necessary amplitude of the oscillation or shaking movement. This should be observed to ensure that the de-moulded cheese block is undamaged, and also that the energy consumption of the device is as low as possible.

A table can also be arranged in place of the conveyor apparatus 8, from which the cheese blocks can be taken away manually or mechanically.

The cheese blocks are supplied on the conveyor apparatus 8 to a further processing step.

It would be likewise possible to place the cheese blocks into a secondary mould or salt bath channel etc. after shaking.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

REFERENCE SYMBOLS

1 Cassette press
2 Trough
3 Cassette
4 Mould
5 Press head
6 End column
7 Handling apparatus
8 Conveying apparatus
9 Cross member
10 Turning unit
11 Clamping frame
12 Unbalance motor
13 Drive rotating pin
14 Toggle joint
15 Chuck
16 Rib structure
17 Spring element
18 Substructure
19 Centring pin
20 Clamping frame
21 Unbalance motor
22 Rocker post
23 Lower bearing
24 Upper bearing
25 Support structure
26 Damping cylinder
27 Rubber damper
28 Suspension

The invention claimed is:

1. A method for producing cheese blocks, wherein a raw cheese mass is poured into a mould and then pressed to remove liquid, the pressed raw cheese mass is detached from an inner wall of the mould and after a turning process emptied out of the mould,
   wherein the raw cheese mass in the mould is subjected to a mechanized shaking movement immediately after turning and prior to emptying out of the mould;
   wherein the shaking movement comprises at least a few strokes at low frequency; and
   wherein the low frequency used is dependent on size of the cheese blocks with bigger cheese blocks using lower low frequency than smaller cheese blocks.

2. The method according to claim 1, wherein the shaking movement is carried out horizontally or vertically.

3. The method according to claim 1, wherein the shaking movement comprises at least one to a few strokes.

4. The method according to claim 1, wherein the mould is turned and emptied after shaking, wherein the cheese block is placed onto a table or a conveyor apparatus.

5. The method of claim 1, wherein the low frequency is no more than about 40 Hz.

\* \* \* \* \*